Aug. 7, 1934.  F. R. FAGEOL  1,969,172
COOLING SYSTEM FOR SELF PROPELLED VEHICLES
Filed Sept. 6, 1930  3 Sheets-Sheet 1
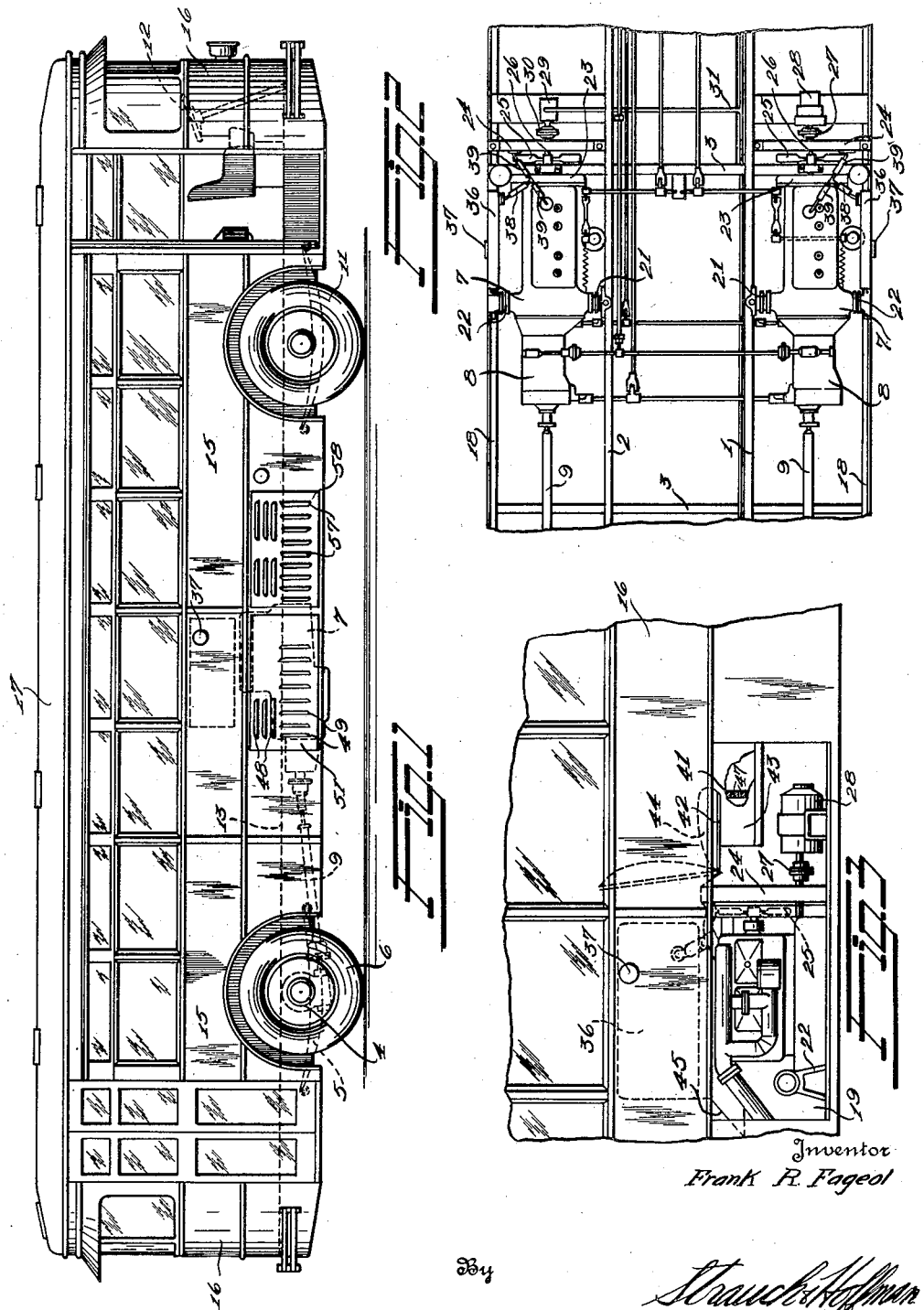
Inventor
Frank R. Fageol
By Aug. 7, 1934.  F. R. FAGEOL  1,969,172
COOLING SYSTEM FOR SELF PROPELLED VEHICLES
Filed Sept. 6, 1930  3 Sheets-Sheet 2
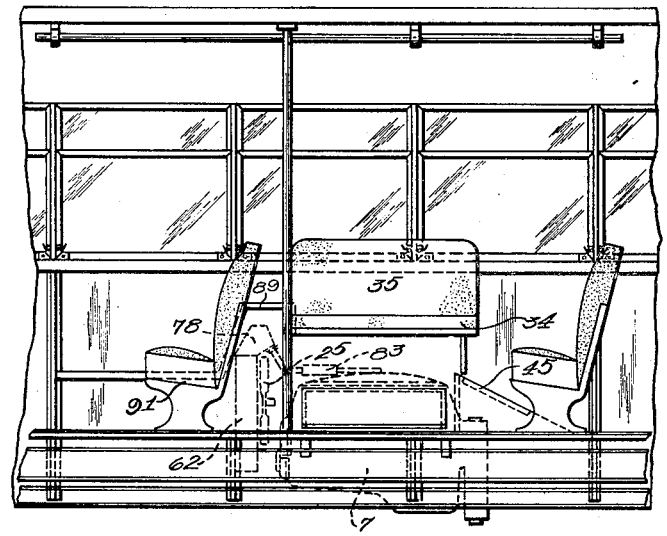
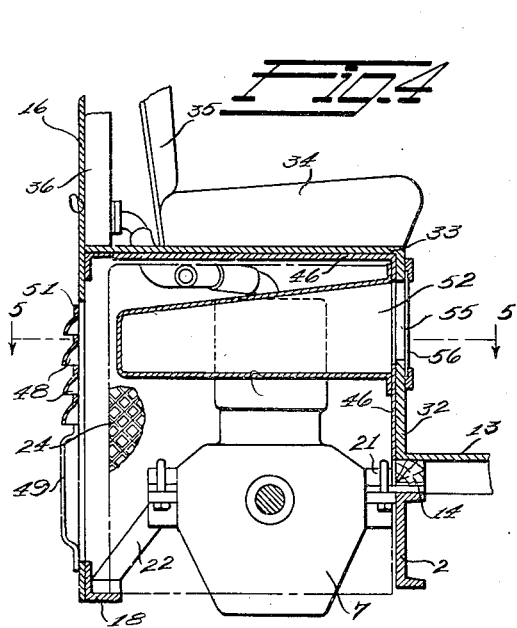
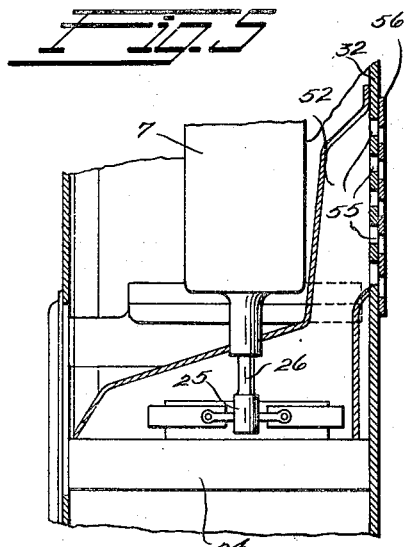
Inventor
Frank R. Fageol
By
Strauch & Hoffman
Attorneys

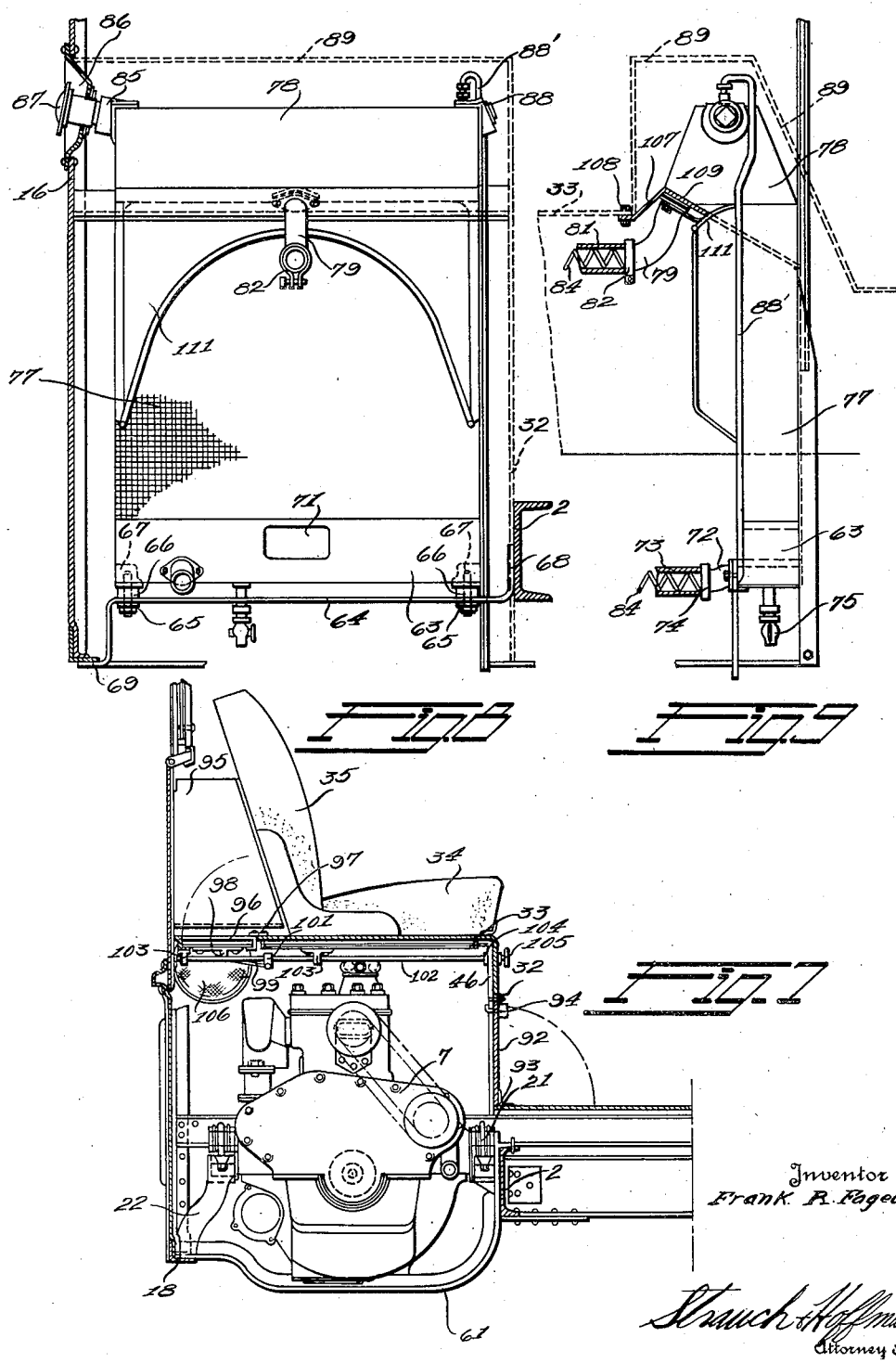

Patented Aug. 7, 1934

1,969,172

UNITED STATES PATENT OFFICE 1,969,172

COOLING SYSTEM FOR SELF-PROPELLED VEHICLES

Frank R. Fageol, Oakland, Calif., assignor to Twin Coach Company, Kent, Ohio, a corporation of Delaware Application September 6, 1930, Serial No. 480,227

14 Claims. (Cl. 180—54)

The present invention relates to cooling and ventilating systems for motor vehicles, and the present application is a continuation in part of application S. N. 191,216 filed May 13th, 1927.

More particularly the present invention relates to cooling and ventilating systems especially adapted for application to motor vehicles with low floor lines and low center of gravity driven by internal combustion engines in which the entire ground space covered by the vehicle may be utilized as passenger or load bearing space.

In such vehicles the disposition of the driving engine or engines in order that the full ground space covered by the vehicle may be used for load carrying capacity, introduces novel problems in the effective cooling of the engines or motors, as well as novel problems in preventing crankcase and exhaust gases from finding their way into vehicle body.

Accordingly, a primary object of the present invention is to provide novel engine housing, and cooling arrangements and special related body constructions for automotive passenger carrying vehicles with low floor line and low center of gravity in which the passenger or load carrying space is substantially equal to the ground space covered by the vehicle.

Another object of the present invention is the provision of a novel coach construction provided with an internal combustion motor or motors arranged in a housing or housings projecting into the body with novel means for preventing exhaust gases and crankcase fumes from finding their way into the vehicle body in substantial volume.

In the operation of large passenger carrying vehicles heating of the body in cold weather to provide for the comfort of the passengers has heretofore been more or less unsatisfactory. In conventional types of buses and passenger carrying vehicles special heating arrangements have been devised to utilize part of the waste engine heat for the purpose of heating the vehicle but such arrangements have been more or less ineffective, unsatisfactory and costly.

Accordingly a further object of the invention is the provision of novel vehicle body and engine supporting, housing and cooling arrangements adapted to permit circulation of air between the body and engine cooling space for ventilation and heating or cooling the body and controlling engine temperatures whereby the engine heat may be utilized for body heating purposes.

Further objects of the invention are such as may be attained from the utilization of various combinations and sub-combinations hereinafter set forth and as defined by the terms of the appended claims.

Referring to the drawings:

Figure 1 is a view of an entire vehicle in side elevation embodying my invention.

Figure 2 is a fragmental plan view of the vehicle shown in Figure 1 with the floor and engine housings removed and showing the frame construction, the power plants, controls and cooling radiator arrangements.

Figure 3 is a side view showing parts of the vehicle wall removed to illustrate the mounting and location of power plants and housing arrangement in a preferred embodiment of the invention.

Figures 4 and 5 are detailed sectional views designed to show the cooling system for the power plants.

Figure 6 is a fragmental interior side view of a coach illustrating a modified form of engine housing and passenger seating arrangement.

Figure 7 is a fragmental transverse sectional view through the coach motor housing and seat arrangement of Figure 6 illustrating a novel heating arrangement.

Figure 8 is a rear elevational view of a radiator assembly and shroud arrangement forming one of the novel elements of my invention.

Figure 9 is a side elevational view partially in section of the construction illustrated in Figure 8.

The invention will be hereinafter described as embodied in a vehicle for the conveyance of passengers intended to perform the same functions as standard types of automotive stages or buses. The preferred form of my invention differs from the conventional type of bus propelled by a self-contained power generating unit such as an internal combustion engine or gas-electric combination in that, in place of an engine or power unit located within the frame adjacent to the forward end thereof and in advance of the body, my power mechanism is located substantially midway between the ends of the said frame. Preferably I use a pair of independent motors or power units, one on each side of the vehicle, so that the drive shaft of each motor will substantially align with one of the traction wheels on opposite sides of the vehicle, to power the vehicle by two separate driving units, which may be operated to drive the respective traction wheels either independently or in unison. By locating the power mechanism between the front and rear axles and also by equipping the vehicle with two driving motors, there results an even distribution of weight throughout the vehicle which produces a better balance in the assembled unit. The material entering into the construction of the vehicle may therefore be lighter and thus reduce the gross weight of the vehicle below that of a conventional type of bus of an equivalent passenger carrying capacity. The arrangement of the motors at the sides of the vehicle also permits free access to the motors in order to repair or replace parts and permits the entire removal of the engine without necessitating the dismantling of the vehicle. The placing of the motors on opposite sides of the vehicle likewise permits each of the rear driving wheels to be driven independently of the other, and eliminates the complicated and weighty rear axles and driving differentials that are now a part of the conventional motor vehicle. Also the two motors can be muffled better and give off less unburned obnoxious gases when decelerating for a stop. If desired, however, particularly in smaller buses, a single power unit may be used located between the axles and at one side of the frame where ready access may be had to the motor from the side in the same manner as when two motors are used, one on each side, in which event power from the single power unit will be communicated to both driving wheels by means of a differential on the rear axle in well known manner.

By locating each power unit at the side of the vehicle, they will be adjacent to the side walls of the body and can therefore be placed under a seat or seats as shown in Figures 2, 3 and 7. This arrangement is feasible even with the low hung so-called "safety" type of automotive bus where, to obtain the stability essential for passenger and similar automotive vehicles, the frame is mounted as close to the ground as road conditions will permit. When located adjacent to the side wall of the body, the power mechanism may be mounted largely or entirely above the frame and still be placed under the seats without interfering in any way with the seating capacity of the vehicle.

By removing the engine from the front of the frame in advance of the body and placing it between the axles, the body and flooring can be extended to occupy the space where the engine was formerly located and by placing the power mechanism outside the frame either in one unit or in two separate units adjacent to and preferably partly supported by the side walls of the body, neither the aisle space nor the seating capacity is interfered with by the power or driving mechanism. By such arrangement the seating capacity of a bus having an overall length of 31′—6″ is increased from 28 or 30 in the standard bus to 40 or 42 in a bus of my construction and the total carrying capacity seated and standing from about 60 to about 80. This arrangement necessitates novel motor cooling and housing constructions and provides novel and effective coach ventilating and heating arrangements forming the particular subject matter of the present invention.

In detail, the construction illustrated in the drawings comprises the frame of a motor vehicle, consisting of a pair of spaced, parallel channels 1 and 2 (Fig. 2) respectively, extending the length of the vehicle and joined at intervals by transverse stiffening bars 3. The parallel channels may be made much lighter than the usual chassis members. In the present construction they may be six inches deep at the middle of the frame, which ordinarily is nine or ten inches deep.

An axle 4, (Fig. 1) is arranged beneath the frame adjacent the rear end thereof, and the opposite ends of said axle are connected by interchangeable leaf springs 5 to opposite sides of the frame.

In the preferred form of my invention in which two independent power units are used, the opposite outer ends of the axle 4 (Fig. 1) are each provided with a housing fixedly secured thereon, in which a shaft is rotatably mounted as shown in said application S. N. 191,216. The outer end of each shaft has a road traction wheel 6 fixedly secured thereon. The road traction wheels 6 are driven by means of power units 7 on the vehicle, through the medium of variable speed transmissions 8, propeller shafts 9 and mechanism located between the springs and the driving wheels 6 in the axle housings to move the vehicle in either a forward or reverse direction as fully disclosed in said application S. N. 191,216. The forward end of the vehicle frame is likewise provided with an axle suspended therefrom, and on the outer ends of which the usual type of front road wheels 11 steered by suitable mechanism, not shown, from steering wheel 12, are mounted. This axle may desirably be located, as shown, approximately the same distance from the front end of the vehicle as the rear axle is from the rear end.

A flooring 13 is arranged across the upper face of the frame members 1 and 2 on wooden sills 14 (Fig. 4). The flooring projects beyond the outer sides of the frame members, and forms a part of the body 15 that is superimposed on the frame members, and the flooring and body together may extend the entire overall length of the vehicle. The body 15 is provided with side and end walls 16 and an enclosing top 17, which, in conjunction with the flooring 13, forms a complete housing to hold and seat passengers to be transported by the vehicle. The side walls 16 of the vehicle body are secured to the projecting side edges of the flooring 13, overhang and extend below the level of the flooring, are arranged in spaced substantially parallel alignment with the frame members 1 and 2, and are secured by suitable lateral cross bars to the frame members 1 and 2, as fully shown in Patent #1,775,754, granted September 16, 1930. The side walls 16 of the body are supported at their lower edges by an outer angle bar frame 18 joined to and supported by channels 1 and 2 and suitably braced by transverse members to give the necessary rigidity and support to the interconnected body and frame. The side and front walls of the body and the roof are preferably made of sheet metal stiffened at intervals with suitable braces. By the use of a suitably stiffened body of box-like structure it becomes unnecessary to employ the usual separate heavy chassis construction upon which the bodies of automotive buses are ordinarily mounted; and in place thereof the relatively light frame longitudinal members above described can be used to which the transverse floor supports, and flooring and the side walls of the body are attached as above set forth.

Between the inside face of the overhanging side walls 16 of the body 15, and the outside face of each of the frame members 1 and 2, a space or compartment 19 is provided in which power units for rotating the road traction wheels 6 are provided. The motors 7 and transmissions 8 are mounted at corresponding points on opposite sides of the outside of the frame members 1 and 2.

One side of an end of each motor is secured in a bracket 21 mounted on the exterior face of each of the channels 1 and 2, respectively, of the frame, and the other side of the same end of each motor is mounted in a bracket 22 secured to one of the outer angle iron frames 18 supporting the side wall 16 of the body. The motor supporting brackets 21 and 22 are preferably padded with some suitable resilient material to provide a cushion mounting for the motor. The forward end of each motor is supported in a bracket 23 secured to one of the transverse supports 3 extending across the space between the outside of the main longitudinal frame members 1 and 2 and the side wall of the body.

In front of the forward end of each engine, a radiator 24 and cooling fan 25 are arranged. The radiators 24 are supported transversely of the body between main frame channels 1 and 2 and side frame angles 18, and the fans 25 are driven by the engine in well known manner to draw air through the cores of radiators 24 and force it over the engines 7.

Shafts 26 connected to the forward ends of the engine crank shafts extend therefrom in axial alignment. The shaft 26 of one of the engines is connected by a flexible coupling 27 to a generator 28, to charge the storage batteries which supply the electricity for lighting the interior of the vehicle body and for starting the engine. An air compressor 29 is connected to the shaft 26 of the other engine by a similar coupling 30, to generate air pressure to be used in operating the brakes of the vehicle through air line 31.

The seating arrangement within the interior of the vehicle body 15 is made to conform to the space that remains within said body after the motors and road wheels have been properly housed. Thus the body will accommodate a greater number of people than can be accommodated in a conventional automotive road bus of substantially the same dimensions.

Each engine is housed by a vertical side wall 32 (Fig. 4) and top 33 forming a supporting ledge for a side seat 34 with a back 35. Supported behind each seat back 35 is a header tank 36 for the associated radiator 24 with a filling inlet 37 in the side walls of the body. Each header tank 36 is connected by conduit 38 to conduit 39 interconnecting the top of radiator 24 with the cooling jacket of its associated engine 7. The engine jackets are connected through suitable conduits and water circulating pumps (not shown) to the bottoms of their respective radiators in well known manner. The space in front of each radiator 24 above floor 10 is housed by a front wall 41, (Fig. 3) top 42 and end wall 43 forming a seat riser and support for cross seat 44, and suitable rear end and side walls 45 (Fig. 3) for the engine housing are provided so that although the engines project substantially above the floor line into the body the engine spaces are completely isolated from the body except for the heating and ventilation duct connections hereinafter described.

A suitable lining of asbestos or other heat insulating material 46 is provided on the inner surfaces of the engine housings through which heat might be transferred in undesirable manner to the passengers occupying seats adjacent to and supported by the engine housings.

An effective ventilating and heating system may be conveniently provided with the engine housing and supporting arrangement so far described by which the air from the interior of the vehicle can be drawn by fans 25 from the interior of body 15 through openings 47 (Fig. 3) in seat risers 41 and either discharged into the air through the associated radiator 24 around the engine and out of the louvers 48 and 49 in the removable side wall panels 51 (Figs. 1 and 4), or be diverted by a duct 52 (Figs. 4 and 5) and discharged after being heated by contact with the radiator and by proximity to the engine into the vehicle through other openings 55 (Fig. 5) in seat risers 32 which openings can be closed by a suitably perforated slide 56 at will. When openings 55 are closed all of the air drawn through the openings 47 will be discharged over the engine into the open air and a ventilating circulation will be set up on the vehicle body. When openings 55 are opened the air withdrawn from the body through openings 47 is mixed with fresh air forced into the engine compartment through forwardly opening louvers 57 (Fig. 1) in removable side wall panel 58 which are arranged to scoop air into the engine compartments due to motion of the vehicle and with air drawn into the engine compartment by suction of the fan. This results in repeated circulation of part of the air from the car body through radiators 24 and the resultant effective warming thereof by increments so that effective heating of the interior of the body is accomplished. Due to the fact that the air passing into duct 52 does not pass around the engine, the noxious gases from the engine are not drawn into the bus with the heated air, the gases being forced out through rearwardly opening louvers 49 by the fan and a suction created by the motion of the vehicle.

The side walls 16 on the opposite sides of the vehicle body are arranged so that panels 51 and 58 may be removed to permit free access to each of the power plants to effect repairs or adjustments.

While the arrangement so far described is satisfactory in commercial operation, in practice I have found that the modified constructions of Figures 6 and 9 inclusive give improved efficiency of operation. By the use of the improved crank case breather or ventilator and exhaust pipe connections disclosed in copending application Serial No. 355,755, filed April 17, 1929 the noxious crankcase gases are consumed in the engine and exhaust gas leakage into the engine housings are eliminated to such an extent that air separating ducts 52 may be eliminated and heated air from the engine housings admitted directly into the vehicle body as will more fully hereinafter appear. This permits adoption of an improved and simplified ventilating arrangement.

In this improved arrangement the water headers are removed from the vehicle's side walls and supported directly above and jointed to the radiator cores, and means are provided to prevent the tendency for the heated air passing through the radiator core to pass forward over the top of the core and recirculate through the radiator due to eddy currents that I have found exist in the construction heretofore described, thereby reducing the efficiency of the cooling and ventilation.

In this form of invention, as shown in Figure 7, adjacent motor brackets 21 and 22 and at suitably spaced points along the bottom of the motor housing spaces and secured between channels 2 and side angles 18 are suitably curved strengthening braces 61, to which in cold weather suitable bottom cover plates may be detachably secured to close the bottom of the engine housings preventing cold air, snow, water etc. from finding their way up through the bottom housings in severe weather.

Mounted directly in front of each of the motors 7 (Fig. 6) is a radiator 62 one of which is illustrated in detail in Figures 8 and 9. As shown each radiator construction comprises a bottom casting member 63 hollow in form and secured to a plate 64 by studs 65 extending through plate 64 and spacing blocks 66 and threaded into inserts 67 in casting member 63. One end of plate 64 is provided with a flange 68 secured as by welding or otherwise, to the adjacent frame member 2. The opposite end of plate 64 is provided with a flange 69 secured to frame member 18. An opening 71 is provided in casting 63 for the motor crank shaft extensions 26. A pipe 72 is in communication with the bottom of casting 63 and tubular hose connection 73 is secured to the flange of pipe 72 by clip 74, the opposite end of the hose being detachably connected with the water pump of the engine 7 in well known manner. A drain cock 75 is provided for casting 63. Secured to casting 63 and in communication therewith is the cellular core 77 which at the upper end thereof supports and is in communication with a hollow header tank 78 provided with a tubular hose connection 79 to which one end of the upper hose 81 is detachably secured by clip 82, the opposite end of hose 81 being detachably secured to tubular member 83 (Fig. 6) that is in communication with the motor water jacket in any well known manner. Each flexible hose 73 and 81 has inserted therein a helical spring 84 to prevent partial collapsing of the hose due to the suction created by the water circulation.

Header 78 is provided with a filling inlet connection 85 extending through and secured in a recessed casting or member 86 secured in body side wall 16 so arranged that end cap 87 is flush with the side wall 16, providing a convenient flush filling connection for the header tank 78. Header 78, opposite connection 85, is provided with overflow connection 88 for an overflow pipe 88'.

In this form of the invention the top of housing 33 forming the supporting ledge for seat 34 and housing side wall 32 forming the riser for the seat are extended as shown in Figures 6, 8, and 9 to house headers 78 as shown at 89, housing section 89 being arranged between side seat 34 and the back of cross seat 91 (Fig. 6).

Provided in seat riser 32 of this form of the invention is an inspection door 92 (Fig. 7) hinged at 93 and disposed adjacent motor 7. A suitable latch 94 normally holds door 92 in closed position.

Disposed between back 35 of seat 34 and side wall 16, at the ends of the seat back, are transverse supporting plates 95, between which the heat controlling door 96 in housing top 33, and hinged at 97, is located. Secured to the lower side of door 96 is a bracket 98 pivotally connected to one end of link 99, the other end of which is pivotally connected to member 101 secured to rod 102. Rod 102 is rotatably mounted in supporting guide members 103 secured to housing top 33, and extends through a guide member 104 in seat riser 32. A suitable actuating handle 105 is provided on the inner end of rod 102. A screen 106 provided around the opening for door 96 is arranged to prevent dirt and dust from being carried into the coach body with air from the engine housing.

In this form of invention due to the use of the improved crankcase breather and ventilator, and the improved exhaust pipe connection of copending application the housings are freed from crank case and exhaust gases to such an extent that the heated air from the housing may be directly admitted to the car body. By rotating handle 105, member 101 functioning as a crank operates link 99 whereby door 96 may be closed or opened to any desired extent. Any other door operating mechanism may be used. When closed the heated air in the engine housings passes out through the side louvers 48 and 49 as above set forth. When door 96 is open the heated air will rise from the housings through the openings back of the side seats due to its bouyancy, in this way providing a flow of fresh heated air into the coach body. If desired opening 47 may be utilized in this form of the invention in the housings in front of the radiators so that part of the air circulated through the engine housings will be withdrawn from the body.

To prevent circulation of eddy currents over the top of header 78 within the housing, and to aid in supporting the radiator assembly, the shrouding arrangement as disclosed in Figures 8 and 9 is preferably utilized. This shrouding arrangement comprises supporting sheet 107 secured at 108 to housing top 33 and extends from housing side 32 to vehicle side 16, preventing air from passing upward over header 78. Header 78 is secured to inclined section 109 of sheet 107 which is also cut to fit around sheet metal fan shroud 111 secured to the rear face of radiator core 77. This arrangement effectively prevents circulation of heated air over header 78 to the front of core 77 increasing the efficiency of cooling materially, and at the same time provides a substantial support for the radiator and header assembly.

It will accordingly be seen that novel effective engine mounting, cooling, ventilating, and related body and seating constructions are provided, permitting convenient utilization of space, motor heat, and circulation induced by the engine fans and vehicle motion with maximum efficiency. Having described preferred embodiments, only of my invention, obvious detailed variations utilizing the spirit of the present invention as expressed by the terms of the appended claims will become apparent to those skilled in the art. Accordingly what is desired to be secured by Letters Patent and claimed as new is:—

1. In a self propelled vehicle, a body, a housing projecting into said body; an internal combustion engine together with a fan and a radiator for said engine disposed in said housing; and air openings in said body arranged to withdraw air from said body into said housing and radiator under influence of said fan and to supply air to said body from said housing without reversal of the direction of flow under the same influence.

2. The combination as set forth in claim 1 together with means for preventing eddy currents within said housing from the rear side to the forward side back of said radiator.

3. In a self propelled vehicle, a body; a housing extending into said body adjacent a side thereof; an internal combustion engine disposed in said housing; a radiator supported transversely across said housing in front of said engine; a fan disposed between said engine and said radiator and driven by said engine to draw air through said radiator and to force it over said engine; and openings in said side to cause circulation of air into said body in front of said radiator when said vehicle is moving in its normal direction of movement.

4. The combination as set forth in claim 3 together with a shroud to prevent return circulation of air from the rear of said radiator to the front thereof.

5. In an automotive road vehicle, a body; a self-contained power generating unit mounted between the ends of said body in a housing extending into said body; a duct positioned with its intake end at a point in said vehicle distant from said power unit in position to cause air from said body to pass through a portion of the cooling system of said unit; and a cooling fan rotated by said unit circulating the air passing through said duct and heated by said cooling system without reversal of the direction of its flow into said body.

6. In an automotive road vehicle a self-contained power generating mechanism consisting of two separate units suitably mounted in the middle of said vehicle at opposite sides thereof, a heating system comprising a pair of ducts, each of said ducts being positioned with its intake end at a point in said vehicle distant from said power units, each of said ducts passing through a portion of the cooling system of one of said units, a cooling fan rotated by each of said units, said fans circulating the air in said ducts to discharge air heated by said cooling system without reversal of direction at points close to said units.

7. In an automotive road vehicle, a self-contained power generating mechanism consisting of two separate units suitably mounted in the middle of said vehicle at opposite sides thereof, a heating system comprising a pair of ducts, each of said ducts being positioned with its intake end at a point in said vehicle distant from said power units and being open to the outer air, each of said ducts passing the air without reversal of the direction of flow through a portion of the radiator of said units, a cooling fan rotated by each of said units, said fans circulating the air in said ducts to discharge air heated by said radiators at points close to said units, and a closing member for the discharge end of said ducts to by-pass said heated air to the outer air.

8. In an automotive road passenger bus having seats for passengers located on the floor of said vehicle, two independent power units each located at one side of the vehicle and under a seat therein, a heating system utilizing the heat from each of said units comprising a pair of ducts, each of said ducts being positioned with its intake end in the riser of a second seat distant from said unit, each of said ducts passing air without reversal of the direction of its flow through a portion of the radiator of one of said units, a cooling fan rotated by each of said units, said fan circulating and discharging the heated air from under said first seat.

9. A motor vehicle comprising a body; a motor housing projecting into said body at each side thereof; a motor in each of said housings; and an adjustable opening in the top of each of said housings for admitting heated air from said motors into said body.

10. A motor vehicle comprising a body; a housing projecting into said body adjacent a side thereof and forming a convenient article supporting ledge; a power unit comprising a cooling system and air circulating fan disposed through said side of the body; and openings in said housings for permitting circulation of outside cooling air through said housing without entering said body and for permitting discharge of heated air from said housing into said body, and means to control the flow of air into said body.

11. An automotive vehicle comprising a passenger carrying body, a self contained power generating plant arranged between the side and end walls of said body, a housing isolating said plant from said body, a seat upon said housing and means to selectively permit the flow of air heated by said plant from said housing upwardly into said body to the rear of said seat under a natural circulation.

12. The combination defined in claim 11 including means forming a part of a side of said body to cause fresh air to be supplied to said housing under circulation induced by the movement of the vehicle in its normal direction.

13. In a self-propelled vehicle, a body, a housing projecting into said body adjacent a side thereof, an internal combustion engine located in said housing, means for inducing a circulation of air through said side into said housing and through said side out of said housing for the purpose of controlling the temperature of said engine, and means for circulating a portion of the air entering said housing into said body for heating and ventilating said body.

14. An automotive road vehicle comprising a closed body, the sides and end walls of said body enclosing a passenger carrying space, a self contained power plant disposed adjacent each of said sides and between the said end walls thereof, housings isolating each of said power plants from said passenger carrying space, means forming a part of each side wall to cause air to enter each housing upon forward motion of said vehicle and to be subsequently discharged therefrom, and means to selectively permit air within said housings heated by the power plant therein to enter said body under a natural upward circulation.

FRANK R. FAGEOL.